United States Patent
Yamamoto (10) Patent No.: US 10,094,424 B2
(45) Date of Patent: Oct. 9, 2018

(54) ROLLING BEARING

(71) Applicant: NTN CORPORATION, Osaka (JP)

(72) Inventor: Naota Yamamoto, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/328,588

(22) PCT Filed: Jul. 15, 2015

(86) PCT No.: PCT/JP2015/070241
§ 371 (c)(1),
(2) Date: Jan. 24, 2017

(87) PCT Pub. No.: WO2016/013463
PCT Pub. Date: Jan. 28, 2016

(65) Prior Publication Data
US 2017/0219012 A1    Aug. 3, 2017

(30) Foreign Application Priority Data

Jul. 25, 2014    (JP) .................................. 2014-151899

(51) Int. Cl.
*F16C 33/82*    (2006.01)
*F16C 33/78*    (2006.01)
(Continued)

(52) U.S. Cl.
CPC ............ *F16C 33/82* (2013.01); *F16C 19/364* (2013.01); *F16C 33/726* (2013.01);
(Continued)

(58) Field of Classification Search
CPC .... F16C 33/726; F16C 33/76; F16C 33/7813; F16C 33/7816; F16C 33/7859; F16C 33/7886; F16C 33/7889; F16C 33/82
See application file for complete search history.

(56) References Cited

U.S. PATENT DOCUMENTS 5,492,416 A    2/1996    Gabelli et al.
8,628,249 B2 *  1/2014   Winkelmann ........ F16C 19/163
                                                277/552
(Continued)

FOREIGN PATENT DOCUMENTS

JP    6-323335         11/1994
JP    2002-250354       9/2002
(Continued)

OTHER PUBLICATIONS

Extended European Search Report dated Jun. 19, 2017 in corresponding European Application No. 15825387.2.
International Premlinary Report on Patentability dated Jan. 31, 2017 in corresponding International (PCT) Application No. PCT/JP2015/070241.
(Continued)

*Primary Examiner* — James Pilkington
(74) *Attorney, Agent, or Firm* — Wenderoth, Lind & Ponack, L.L.P.

(57) ABSTRACT

A rolling bearing includes an outer race, an inner race, rolling elements mounted between the outer race and the inner race, and a seal ring formed with an oil passage hole and covering at least one of the axial end openings of the bearing space of the bearing. A filter is mounted to the seal ring so as to cover the oil passage hole of the seal ring, and is configured to catch foreign matter contained in lubricant oil, and a magnetic member is mounted axially inwardly of, and adjacent to, the filter, and is configured to attract foreign matter to the magnetic member due to the magnetic force of the magnetic member.

19 Claims, 7 Drawing Sheets

(51) Int. Cl.
*F16C 33/72* (2006.01)
*F16C 19/36* (2006.01)

(52) U.S. Cl.
CPC ...... *F16C 33/7813* (2013.01); *F16C 33/7816* (2013.01); *F16C 33/7889* (2013.01)

(56) References Cited

U.S. PATENT DOCUMENTS

| | | | |
|---|---|---|---|
| 9,476,456 B2* | 10/2016 | Shimizu | F16C 33/667 |
| 2005/0014598 A1 | 1/2005 | Ishikawa et al. | |
| 2013/0077905 A1* | 3/2013 | Shimizu | F16C 33/7813 384/445 |
| 2015/0316101 A1 | 11/2015 | Honda | |

FOREIGN PATENT DOCUMENTS

| | | |
|---|---|---|
| JP | 2005-226794 | 8/2005 |
| JP | 2012-102767 | 5/2012 |
| JP | 2012-189101 | 10/2012 |
| JP | 2012-202417 | 10/2012 |
| JP | 2013-133846 | 7/2013 |
| JP | 2014-20506 | 2/2014 |
| WO | 2013/069403 | 5/2013 |

OTHER PUBLICATIONS

International Search Report dated Oct. 6, 2015 in corresponding International (PCT) Application No. PCT/JP2015/070241.
Notification of Reasons for Refusal dated May 8, 2018 in Japanese Application No. 2014-151899, with machine translation.

* cited by examiner

ROLLING BEARING

TECHNICAL FIELD

The present invention relates to a rolling bearing lubricated with oil, particularly to a rolling bearing lubricated with oil flowing into the rolling bearing through filters.

BACKGROUND ART

Rolling bearing are mounted to movable portions of power transmission mechanisms or travel units of automobiles and various kinds of construction machines, or to movable portions of motors, hydraulic pumps, or various kinds of industrial machines. If such a rolling bearing is used under the circumstances that lubrication is not sufficient due to low film thickness ratio A, etc. or used under relatively harsh conditions, wear powder (such as iron powder) or another type of foreign substance might go into the rolling bearing.

If due to the continuous operation of a machine, a large amount of foreign matter goes into the lubricant oil with a bearing lubricated insufficiently, a portion of the bearing might be damaged, which might shorten the service life of the bearing.

In order to extend the service life of a bearing, it is known to mount to the bearing a filter for preventing foreign matter from going into the bearing space of the bearing. Specifically, it is know that a seal ring closing one side of the bearing space of a bearing is formed with an oil passage hole through which oil flows, and a filter for catching foreign matter is fitted in the oil passage hole (e.g., see the below-discussed four Patent documents).

Japanese Unexamined Patent Application Publication No. 1106-323335 discloses a rolling bearing including a filter of which the porosity is determined on the basis of how the bearing is used, the required optimum service life of the bearing, or lubrication performance in the bearing (see paragraph [0009] of that reference). However, the rolling bearing might not be able to perform two functions under harsh use conditions. Specifically, the bearing might not enable the smooth flow of lubricant oil into and out of the bearing space, and might not prevent the entry of foreign matter into the bearing space. If the mesh portion of the filter is set to be small such that the filter can reliably catch foreign matter, the filter might be clogged with foreign matter, thereby making it difficult to lubricate the bearing sufficiently.

Japanese Unexamined Patent Application Publication No. 2002-250354 discloses a bearing including a filter assembly comprising an internal filter having a fine mesh portion, and an external filter having a coarse mesh portion. Since the mesh portion of the external filter is coarse, and the mesh portion of the internal filter is fine, it is possible to prevent the filter assembly from being clogged with foreign matter, and to remove foreign matter. However, according to confirmation tests, even the use of a filter having a mesh size smaller than the size of foreign matter tends to shorten the service life of the bearing (see comparative examples 2, 3, 4 of that reference). It is estimated from these tests that due to the fact that the mesh size of the filter is not uniform, and the size of foreign matter is also not uniform, the mesh portion of the filter is partially larger than some foreign matter ("mesh size>foreign matter size"), so that some foreign matter has passed through the mesh portion of the filter.

In such a filter structure, foreign matter caught by a filter might be stirred by the flow of lubricant oil, and float in the lubricant oil again.

In order to overcome such a problem, Japanese Unexamined Patent Application Publication No. 2012-202417 discloses a bearing in which a permanent magnet is mounted in the vicinity of the mesh portion of a filter such that foreign matter is attracted to the magnet due to the magnetic force thereof. However, with this arrangement, the permanent magnet tends to attract thereto foreign matter existing outside of the bearing, too. Moreover, the permanent magnet is directly exposed to the outside of the bearing space of the bearing, so as to attract more foreign matter thereto. Therefore, if due to the continuous operation of the bearing, the amount of foreign matter attracted to the permanent magnet exceeds the magnetic force of the permanent magnet (such that the permanent magnet is unable to attract thereto the foreign matter by its magnetic force), a large amount of foreign matter attracted to the permanent magnet might separate from the permanent magnet simultaneously all together.

Japanese Unexamined Patent Application Publication No. 2012-102767 discloses a bearing in which captured foreign matter does not fall into the bearing. However, this structure makes a filter and a seal ring large. Also, this structure is effective for foreign matter going into the bearing from the outside of the bearing, but is not effective for small foreign matter able to pass through a filter, or for wear powder of bearing parts generated in the bearing.

It is an object of the present invention to more reliably prevent foreign matter from floating in the bearing space of a rolling bearing, while maintaining lubrication performance in the rolling bearing.

SUMMARY OF THE INVENTION

In order to achieve the above object, the present invention provides a rolling bearing comprising: an outer race; an inner race; rolling elements mounted between the outer race and the inner race; a seal ring formed with an oil passage hole, and covering at least one of two axial end openings of a bearing space defined between the outer race and the inner race; a filter mounted to the seal ring so as to cover the oil passage hole of the seal ring, and configured to catch foreign matter contained in lubricant oil; and a magnetic member mounted axially inwardly of the filter, and configured to attract foreign matter to the magnetic member due to a magnetic force of the magnetic member.

The magnetic member may be mounted axially inwardly of the filter and adjacent to the filter.

With these arrangements, it is possible to attract foreign matter existing in the bearing space of the bearing to the magnetic member due to the magnetic force of the magnetic member on the axial inner side of the filter, while maintaining lubrication performance in the rolling bearing due to lubricant oil flowing into the bearing through the filter. Therefore, it is possible to more reliably prevent foreign matter from floating in the bearing space of the rolling bearing.

Since the magnetic member is mounted axially inwardly of the filter, it is possible to prevent foreign matter existing outside of the bearing from being attracted to the vicinity of the bearing. Also, since the magnetic member is not directly exposed to the external space of the bearing, and the filter is arranged axially outwardly of the magnetic member so as to be interposed between the magnetic member and the external space of the bearing, the amount of foreign matter attracted to the magnetic member is relatively small. Therefore, it is possible to reduce the likelihood that a large amount of foreign matter attracted to the magnetic member separates from the magnetic member simultaneously all together.

The rolling bearing may be configured such that a space is defined between an axial inner surface of the filter and an axial outer surface of the magnetic member such that, due to the magnetic force thereof, the magnetic member is more likely to attract, to the magnetic member, foreign matter mixed in lubricant oil existing axially inwardly of the filter than to attract, to the magnetic member, foreign matter mixed in lubricant oil existing axially outwardly of the filter.

In the rolling bearing, the filter and the magnetic member may be formed by insert molding so as to be integral with the seal ring.

In the rolling bearing, the magnetic member may be exposed to an inner surface of the oil passage hole. Also, the rolling bearing may further comprise a foreign matter reservoir located axially inwardly of the magnetic member, and configured such that if foreign matter attracted to the magnetic member separates from the magnetic member, the foreign matter is caught and retained in the foreign matter reservoir.

EFFECTS OF THE INVENTION

In the rolling bearing of the present invention, it is possible to attract foreign matter existing in the bearing space of the bearing to the magnetic member due to the magnetic force of the magnetic member on the axial inner side of the filter, while maintaining lubrication performance in the rolling bearing due to lubricant oil flowing into the bearing through the filter. Therefore, it is possible to more reliably prevent foreign matter from floating in the bearing space of the rolling bearing.

DETAILED DESCRIPTION OF THE INVENTION

Figure 1A:
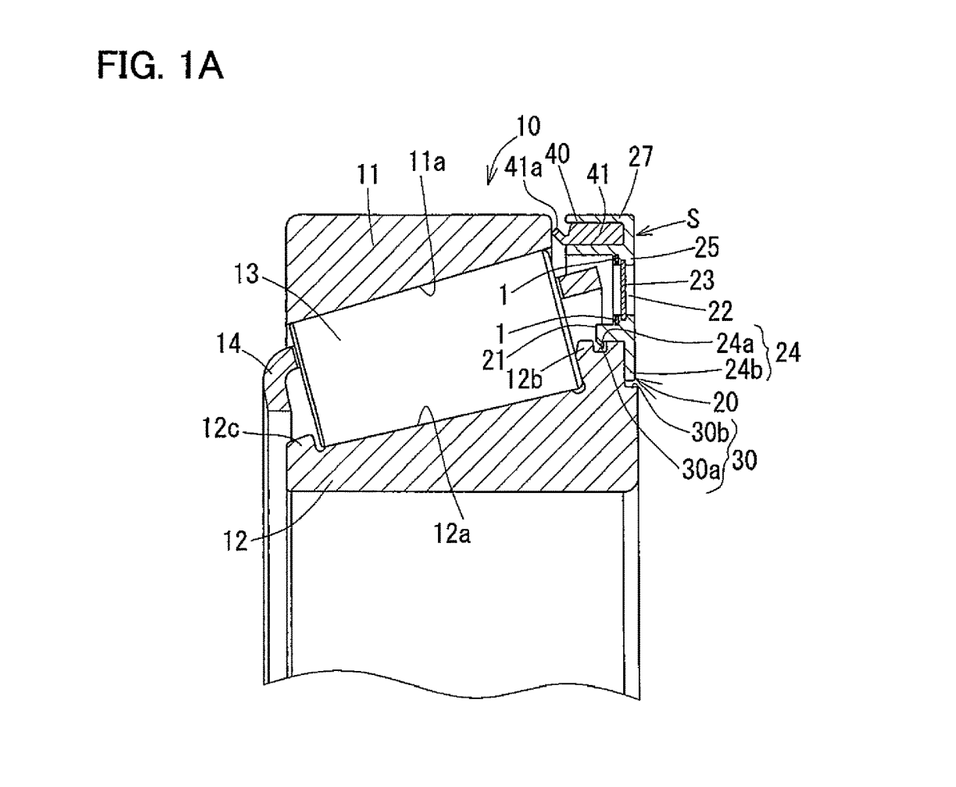
FIG. 1A is a sectional view of a portion of a rolling bearing according to an embodiment of the present invention.
Figure 1B:
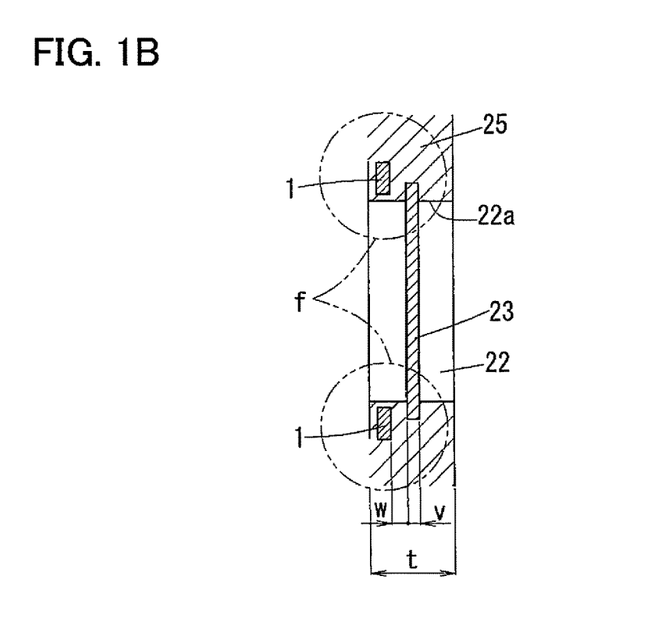
FIG. 1B is an enlarged view of a portion of the rolling bearing illustrated in FIG. 1A.
Figure 1C:
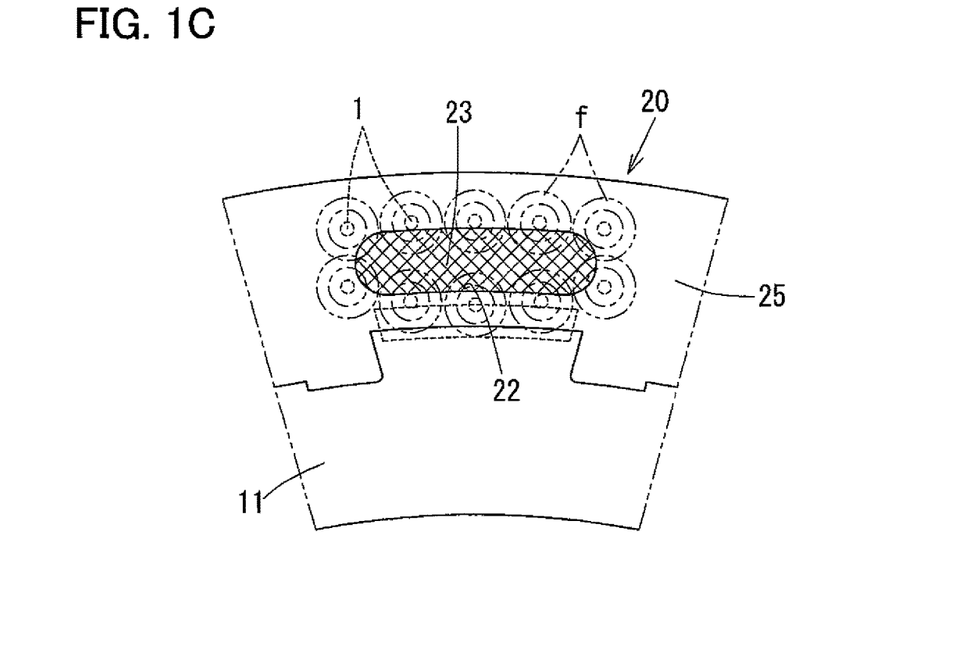
FIG. 1C is a side view of a portion of the rolling bearing illustrated in FIG. 1A.
Figure 2A:
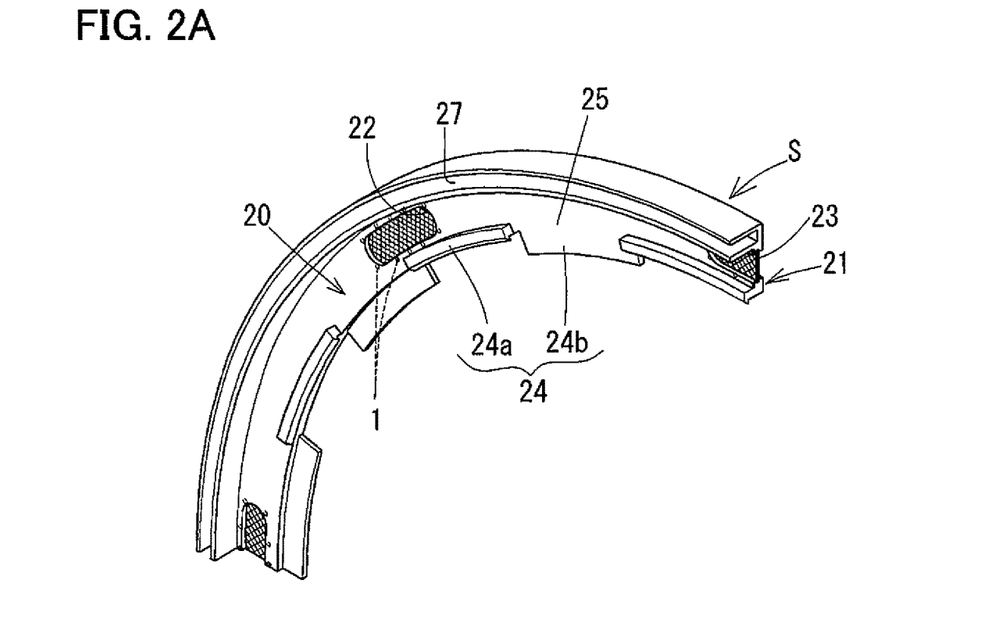
FIG. 2A is a perspective view of a seal ring of which a portion is cut.
Figure 2B:
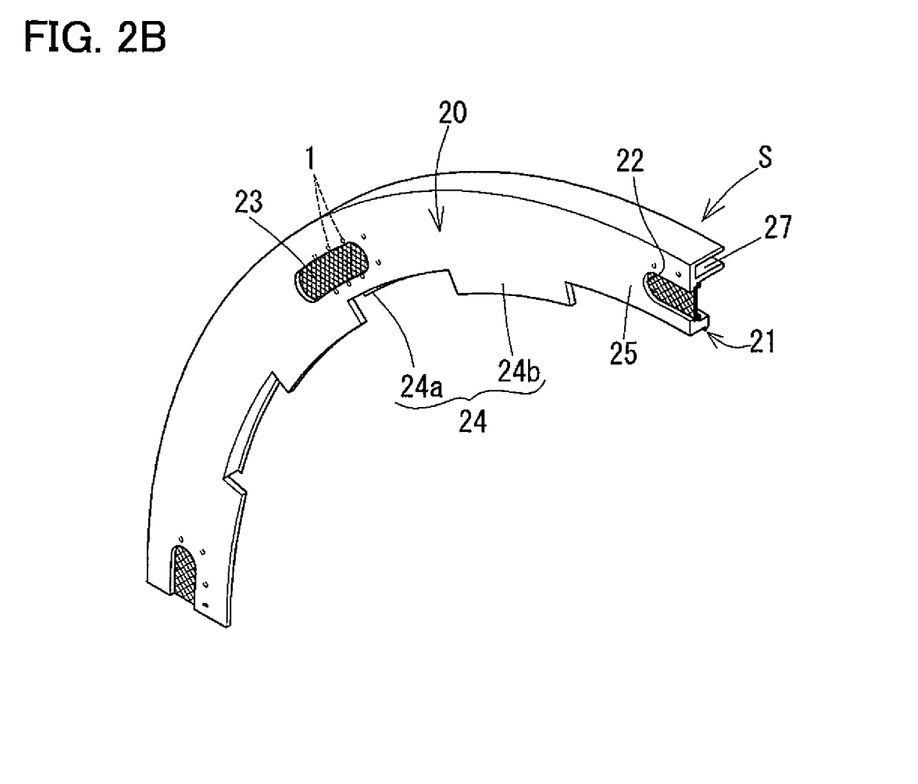
FIG. 2B is a perspective view of a seal ring of which a portion is cut.
Figure 3A:
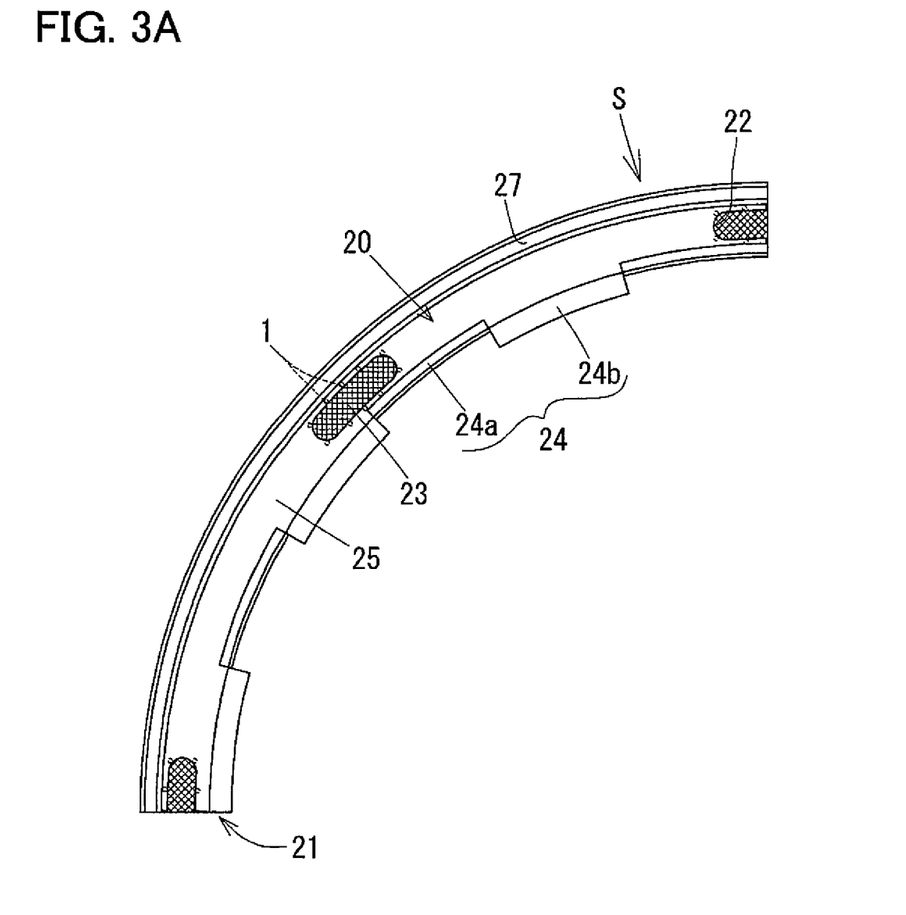
FIG. 3A is a side view of a seal ring.
Figure 3B:
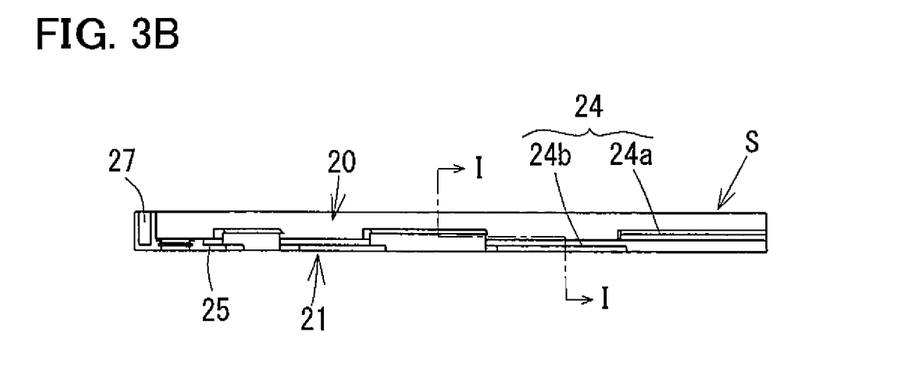
FIG. 3B is a sectional view of the seal ring illustrated in FIG. 3A.

The rolling bearings embodying the present invention are now described with reference to the drawings. FIGS. 1A to 1C are enlarged sectional views of a portion of a rolling bearing 10 according to one embodiment of the present invention.

This rolling bearing 10 is a tapered roller bearing mounted to a movable portion of a hydraulic pump, and including, as illustrated in FIGS. 1A to 1C, an outer race 11 formed with a raceway 11a, an inner race 12 formed with a raceway 12a, a large diameter flange 12b, and a small diameter flange 12c, and rolling elements 13 in the form of tapered rollers mounted between the raceway 11a of the outer race 11 and the raceway 12a of the inner race 12 and between the large and small diameter flanges 12b and 12c of the inner race 12. The rolling elements 13 are retained by a retainer 14 along the circumferential direction of the bearing.

As illustrated in FIG. 1A, the inner race 12 and the outer race 11 are arranged such that the distance between the raceway 11a of the outer race 11 and the raceway 12a of the inner race 12 decreases from one axial end (right end in FIG. 1A) of the bearing toward the other axial end (left end) thereof.

In the casing of the hydraulic pump, the rolling bearing 10 and the movable portions of the hydraulic pump other than those of the rolling bearing 10 (these movable portions are hereinafter simply referred to as the "other" movable portions of the hydraulic pump) are lubricated by the same lubricant oil. Namely, with the rolling bearing 10 at least partially kept soaked in lubricant oil that circulates in the casing, the rolling bearing 10 and the other movable portions of the hydraulic pump are lubricated by the same lubricant oil circulating in the casing.

The rolling bearing 10 may be configured such that the outer race 11 is rotatable with the inner racer 12 fixed in position, or such that the inner race 12 is rotatable with the outer race 11 fixed in position.

As illustrated in FIGS. 1A to 1C, the rolling bearing 10 further includes a seal member S mounted to one axial end of the rolling bearing so as to cover the one axial end opening of the bearing space defined between the outer and inner races 11 and 12. As necessary, a similar seal member S may be mounted to the other axial end opening of the bearing space. Lubricant oil flows into and out of the rolling bearing 10 through these openings of the bearing space.

The seal member S includes a seal ring 20 (seal ring body) having an engagement portion 21 engaged with the inner race 12 of the rolling bearing 10, a wall portion 25 integrally connected to the engagement portion 21, and extending radially outwardly from the engagement portion 21, and a lip mounting portion 27 integrally connected to the radially outer edge of the wall portion 25.

The seal ring 20 is made of a resin, and formed with oil passage holes 22 in the wall portion 25 thereof. The seal ring 20 further includes filters 23 made of a resin, and formed by insert molding so as to be integral with the seal ring 20, and to cover the respective oil passage holes 22.

Each filter 23 is a sheet-like mesh member having a uniform thickness, and located at substantially the center of the corresponding oil passage hole 22 in the lengthwise direction of the hole 22 (in the thickness direction of the seal ring 20). The peripheral edge portion of the filter 23 is embedded in the resin of the seal ring 20 around the oil passage hole 22 such that the filter 23 is fixed to the seal ring 20.

In this embodiment, the filters 23 and the seal ring 20 are made of polyamide resin, etc. However, they may be made of a resin other than polyamide resin, such as polyacetal (POM), polycarbonate (PC), polyethylene terephthalate (PET), polybutylene terephthalate (PBT), polyetheretherketone (PEEK), polyphenylene sulfide (PPS), polytetrafluoroethylene (PTFE), polysulfone (PSF), polyethersulfone (PES), polyimide (PI) or polyetherimide (PEI). A glass fiber reinforced resin based on one of the above-mentioned resins may also be used, such as PA (polyamide) 46+GF, or PA (polyamide) 66+GF.

Also, the filters 23 and/or the seal ring 20 may be made of, instead of glass fiber reinforced resin, carbon fiber reinforced resin, polyethylene fiber reinforced resin, or aramid fiber reinforced resin.

A circular annular member 40 is fitted on and fixed to the lip mounting portion 27 of the seal ring 20. The circular annular member 40 is made of a rubber softer than the material of the seal ring 20. If the circular annular member 40 is made of a synthetic rubber, such a synthetic rubber may be nitrile rubber, acrylic rubber, urethane rubber, or fluoro rubber.

In this embodiment, the lip mounting portion 27 of the seal ring 20 has a sectional shape like the Japanese character "コ" (a backwards "C" shape). However, the lip mounting portion 27 may have a different shape.

As illustrated in FIGS. 2A to 3B, the oil passage holes 22 comprise elongated holes having a long elliptical shape when seen from one lateral side of the seal ring 20. The oil passage holes 22 (plural) are spaced apart from each other in the circumferential direction of the seal ring 20. The shape and the number of the oil passage holes 22, and the intervals between the oil passage holes 21 are not limited, and may be altered as necessary. For example, the oil passage holes 22 may comprise elongated holes having a rectangular shape when seen from one lateral side of the seal ring 20, or holes having a circular, square, or polygonal shape when seen from one lateral side thereof.

The filters 23 may be net members made of a resin, and having a mesh size of about 0.1 to 1 mm. In this embodiment, the filters 23 are net members made of a resin, and having a mesh size of 0.5 mm. However, the mesh sizes of the filters 23 can be set as necessary according to the diameter of foreign matter which is to be caught by the filters 23.

The engagement portion 21, disposed on the inner diameter side of the seal ring 20, is received in circumferential seal grooves (recesses) 30 formed in the inner race 12 so that the seal member 20 is engaged with the inner race 12 so as to be movable in the radial direction relative to the inner race 12 when the seal ring 20 is thermally expanded.

The structures of the engagement portion 21 and the seal grooves 30 are now described in detail. As illustrated in FIGS. 1A to 1C, the engagement portion 21 of the seal member 20 includes protrusions 24 extending radially inwardly from the radially inner edge of the wall portion 25.

The protrusions 24 comprise inner protrusions 24a close to the rolling elements 13, and outer protrusions 24b remote from the rolling elements 13. The seal grooves 30 comprise inner seal grooves 30a in which the respective inner protrusions 24a are received, and outer seal grooves 30b in which the respective outer protrusions 24b are received.

With the protrusions 24 received in the seal grooves 30, the seal ring 20 is in engagement with the inner race 12 so as to be movable in the radial direction relative to the inner race 12 when the seal ring 20 is thermally expanded. Since the protrusions 24 comprise the inner protrusions 24a and the outer protrusions 24b axially spaced apart from the inner protrusions 24a, it is possible to more reliably keep the seal ring 20 in engagement with the inner race 12.

In the state in which the temperature of lubricant oil for the rolling bearing 10 has not risen yet, the lengths of the portions of the inner protrusions 24a received in the respective inner seal grooves 30a are set to be smaller than the lengths of the portions of the outer protrusions 24b received in the respective outer seal grooves 30b. Therefore, when the seal ring 20 is pushed into the opening of the bearing space and fixed in position, the inner protrusions 24a, located axially inwardly of the outer protrusions 24b, can be easily fitted in the inner seal grooves 30a by elastically or thermally deforming the inner protrusions 24a.

Since the lengths of the portions of the outer protrusions 24b received in the outer seal grooves 30b are larger than the lengths of the portions of the inner protrusions 24a received in the inner seal grooves 30a, even when the temperature of lubricant oil rises, and thus the seal ring 20 is thermally expanded to a large extent in the radial direction, the outer protrusions 24b can be kept engaged in the outer seal grooves 30b. Since the seal ring 20 can be kept in engagement with the inner race 12 even in such an expanded state, the seal ring 20 and the inner race 12 define therebetween no gap(s) though which harmful foreign matter can go into the rolling bearing 10.

Since, as illustrated in FIGS. 2A to 3B, the inner protrusions 24a circumferentially alternate with the outer protrusions 24b, when the seal ring 20 is pushed into the opening of the bearing space and fixed in position, the inner protrusions 24a are less likely to be hidden from view by the outer protrusions 24b. This makes it possible to easily confirm in a visible manner that the inner protrusions 24a, which are located axially inwardly of the outer protrusions 24b, are fitted in the inner seal grooves 30a. FIGS. 1A to 1C include or are sectional views of the seal rings 20 taken along line I-I of FIG. 3B, the sectional views showing in a comparable manner the positional relationship between the inner protrusions 24a and the outer protrusions 24b, and the radial lengths of the inner and outer protrusions 24a and 24b.

The outer seal grooves 30b are open to one end surface of the inner race 12. After the outer protrusions 24b are fitted into the outer seal grooves 30b, an axle is fitted into and fixed to the inner race 12 until a shoulder of the axle is brought into abutment with the one end surface of the inner race 12, thereby closing the open end surfaces of the respective outer seal grooves 30b.

The seal ring 20 includes magnetic members 1, provided axially inwardly of, and adjacent to, each filter 23 so as to attract foreign matter to the magnetic members 1 due to their magnetic forces. The magnetic members 1 may comprise permanent magnets.

As illustrated in FIGS. 1A to 1C, the magnetic members 1 as well as the filters 23 are formed by insert molding so as to be integral with the seal ring 20.

The magnetic members 1 are fixed by insert molding to the portions of the seal ring 20 in the vicinity of each filter 23. In the embodiment of FIGS. 1A to 1C, the magnetic members 1 are embedded in and fixed to the resin forming the seal ring 20 in the vicinity of each filter 23 so as not to be exposed to the inner surface 22a of the corresponding oil passage hole 22, namely so as to be spaced apart from, and thus covered by, the inner surface 22a.

Figure 4A:
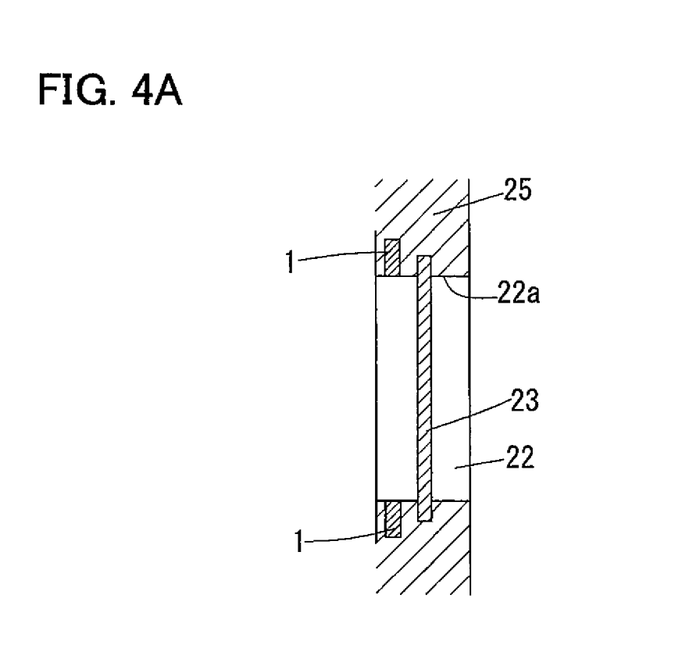
FIG. 4A is a sectional view illustrating a modification of the embodiment of FIG. 1B.
Figure 4B:
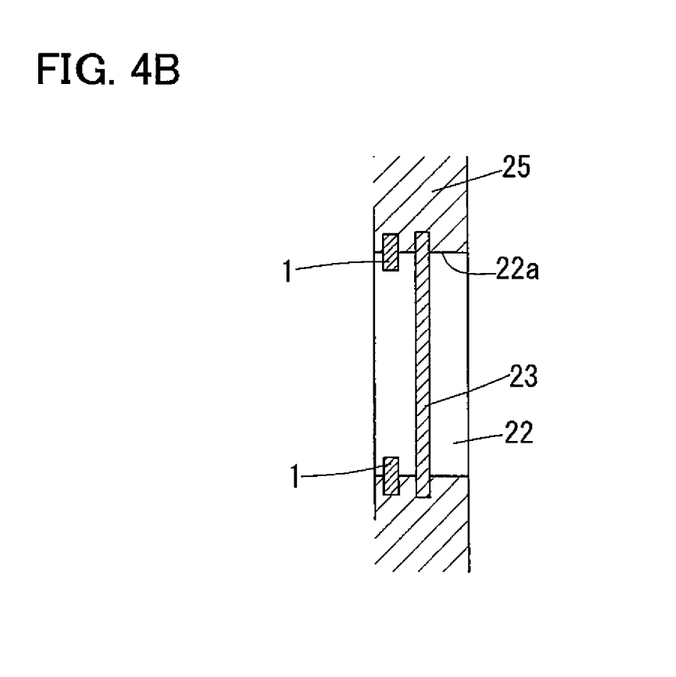
FIG. 4B is a sectional view illustrating another modification of the embodiment of FIG. 1B.

However, the magnetic members 1 are only required to be provided axially inwardly of, and adjacent to, the filters 23, and do not necessarily need to be provided so as not to be exposed to the inner surfaces 22a of the oil passage holes 22. For example, the magnetic members 1 may be exposed to the inner surfaces 22a of the oil passage holes 22 as illustrated in FIGS. 4A and 4B. In FIG. 4A, the magnetic members 1 are fixed in position such that the surface of each of the magnetic members 1 is flush with the inner surface 22a of the corresponding oil passage hole 22. In FIG. 4B, the magnetic members 1 are fixed in position such that a portion of each of the magnetic members 1 protrudes from the inner surface 22a of the corresponding oil passage hole 22.

The magnetic members 1 adjacent to each filter 23 comprise not a large permanent magnet but a plurality of small magnets. By fixing such small magnets in position while being spaced apart from each other, the magnetic members 1 can be arranged such that the magnetic forces of the magnetic members 1 act on only the inner side of the bearing or such that the magnetic forces thereof cover the whole of the mesh portion of each filter 23 through which oil passes.

For example, by making each magnetic member 1 small, and weakening the magnetic force of the magnetic member, as illustrated in FIG. 1B, it is possible to set the attracting force of the magnetic member 1 by its magnetic force to be likely to act on foreign matter mixed in the lubricant oil existing axially inwardly of the corresponding filter 23, and to be less likely to act on foreign matter mixed in the lubricant oil existing axially outwardly of the corresponding filter 23.

The lines indicated by reference symbol "f" in FIG. 1C show the areas in which the attracting forces of the respective magnetic members 1 by their magnetic forces are applied. The magnetic members 1 are configured to be capable of attracting foreign matter of such a size to enter, or be generated in, the bearing space. The areas "f", in which the attracting forces of the magnetic members 1 are applied, extend to a portion of the bearing space significantly away from the inner surface of the seal ring 20, and do not extend to the outer surface of the seal ring 20. Due to this, the magnetic members 1 are likely to attract thereto foreign matter mixed in the lubricant oil existing axially inwardly of the filters 23, and are less likely to attract thereto foreign matter mixed in the lubricant oil existing axially outwardly of the filters 23. The areas "f" may be set not to extend to the portion of the seal ring 20 located axially outwardly of the filters 23.

As illustrated in FIG. 1B, spaces "w" are defined between the axial inner surface of each filter 23 and the respective axial outer surfaces of the corresponding magnetic members 1. Each filter 23 has a center line "c" in the direction of thickness "v" of the filter 23. Thus, the axial outer surfaces of the magnetic members 1 are located axially inwardly of the center line "c" of each filter 23, and are spaced apart from the center line "c" by the distance: w+(v/2). The center line "c" is located at the center of the thickness "T" of the portion of the seal ring 20 formed with the corresponding oil passage hole 22.

Under the condition that the magnetic members 1 are able to catch foreign matter in the bearing space, the axial outer surfaces of the magnetic members 1 may be located closer to each filter 23 than is shown in FIG. 1B. That is, the distance w+(v/2) may be smaller than is shown in FIG. 1B. Also, the magnetic members 1 may be brought into abutment with the axial inner surface of each filter 23. However, it is preferable that the magnetic members 1 are located axially inwardly of the center line "c" of each filter 23. If the magnetic members 1 are located axially inwardly of the center line "c" of each filter 23, the magnetic members 1 may be fixed to the portions of the seal ring 20 deeper than the portions of the seal ring 20 in which the peripheral edge portions of the filter 23 are embedded.

Figure 5A:
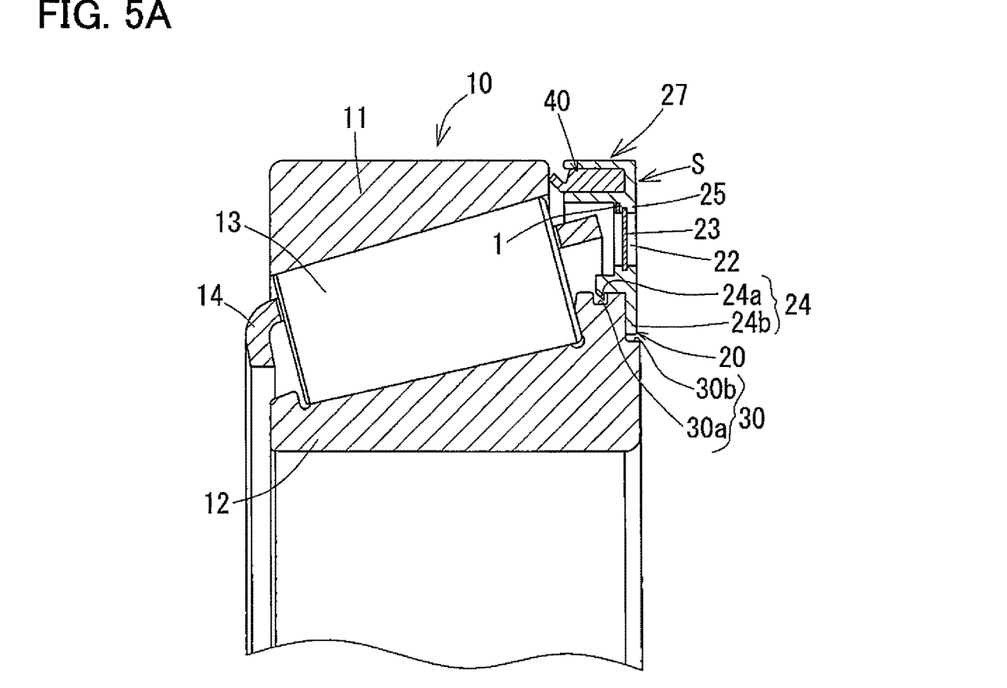
FIG. 5A is a sectional view of a portion of a rolling bearing according to another embodiment of the present invention.
Figure 5B:
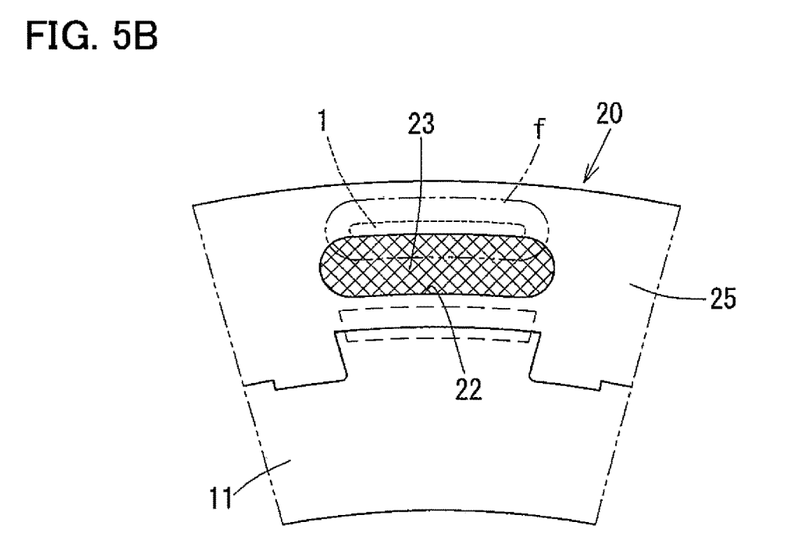
FIG. 5B is a side view of a portion of the rolling bearing illustrated in FIG. 5A.

FIGS. 5A and 5B illustrate a rolling bearing 10 according to another embodiment of the present invention. This rolling bearing 10 includes magnetic members 1 having an elongated shape, and each fixed to the portion of the seal ring 20 around the corresponding oil passage hole 22. Specifically, the magnetic members 1 each comprises an elongated or rod-shaped member extending in the direction in which the oil passage hole 22 extends, which comprises an elongated hole.

The elongated or rod-shaped magnetic members 1 may be arranged, as illustrated in FIGS. 5A and 5B, radially outside of the respective oil passage holes 22, or arranged radially inside of the oil passage holes 22. Otherwise, two of such magnetic members 1 may be arranged radially outside and inside of each oil passage hole 22, respectively.

Figure 6:
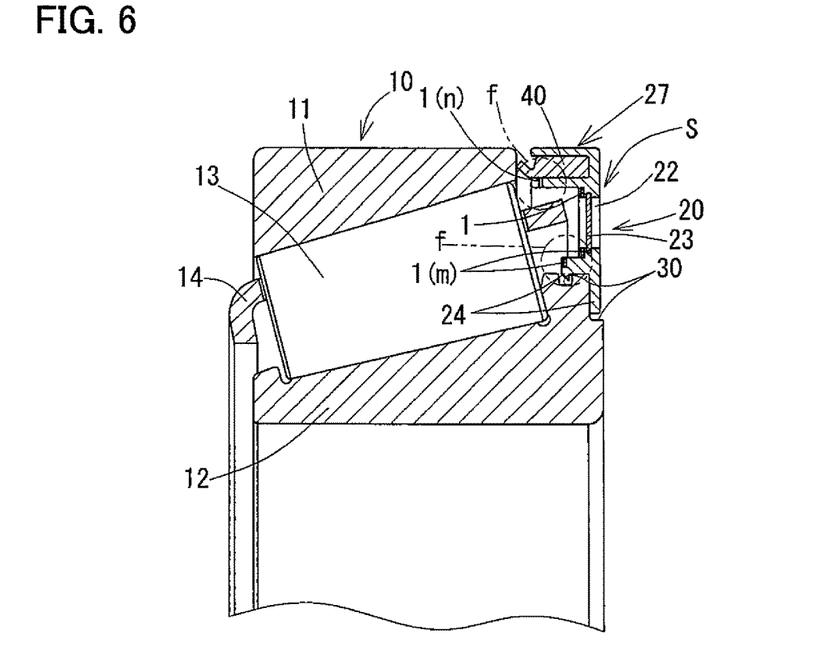
FIG. 6 is a sectional view of a portion of a rolling bearing according to still another embodiment of the present invention.

FIG. 6 illustrates a rolling bearing 10 according to still another embodiment of the present invention. This rolling bearing 10 includes magnetic members 1 provided axially inwardly of the filter 23 in each oil passage hole 22 so as to be adjacent to the filter 23 as in the above embodiments, and additional magnetic members 1(m) and 1(n) provided at portions of the seal ring 20 somewhat away from the filter 23 such that the magnetic forces of the additional magnetic members 1(m) and 1(n) do not reach (i.e., the areas "f", in which the attracting forces thereof are applied, do not extend to) at least the raceways 11a and 12a of the bearing.

In the embodiment of FIG. 6, the additional magnetic members are circumferentially arranged in the axial inner portion "m" of the engagement portion 21, and in the axial inner portion "n" of the lip mounting portion 27. By providing the additional magnetic members 1 at the axial inner portions "m and n", the areas "f" in which the attracting forces of the additional magnetic members 1 are applied can be set not to extend to the portions of the seal ring 20 located axially outwardly of the filters 23. The additional magnetic members 1(m) and 1(n) provided at the axial inner portions "m and n" do not necessarily need to be, but are preferably, arranged in the circumferential direction of the seal ring 20.

Figure 7:
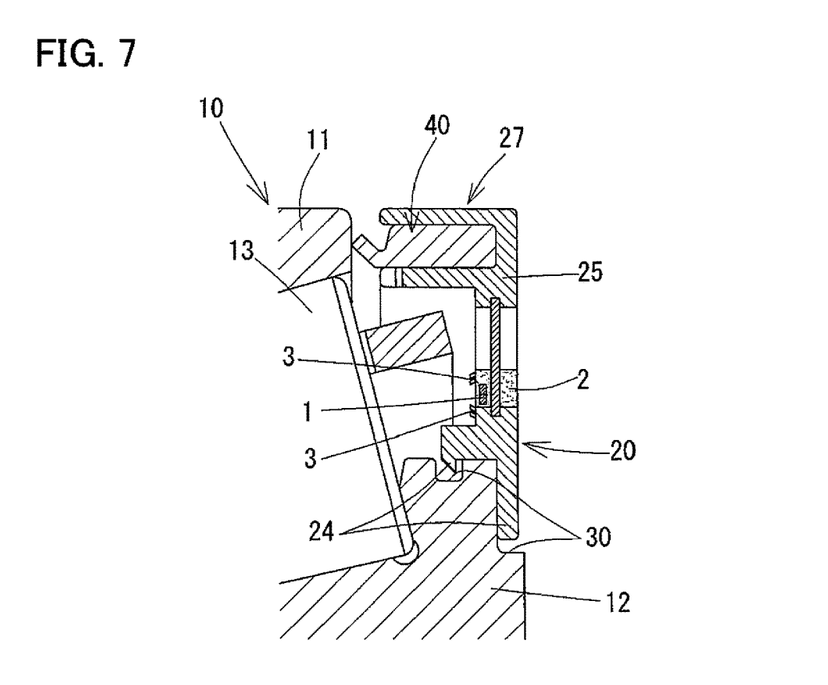
FIG. 7 is a sectional view of a portion of a rolling bearing according to yet another embodiment of the present invention.

FIG. 7 illustrates a rolling bearing 10 according to yet another embodiment of the present invention. This rolling bearing 10 further includes a catching element by which, even if foreign matter attracted to magnetic members 1 separates from the magnetic members 1, the foreign matter can be caught so as not to be separated from the seal member S.

Specifically, as illustrated in FIG. 7, the catching element comprises foreign matter reservoirs 3 each provided axially inwardly of the portion of the seal ring 20 in which the corresponding magnetic members 1 are mounted, and configured such that even if foreign matter attracted to the magnetic members 1 separates from the magnetic members 1, the foreign matter is caught and retained in the foreign matter reservoirs 3.

Each foreign matter reservoir 3 is constituted by an annular member protruding from the axial inner surface of the seal ring 20 such that the inner diameter of the annular member gradually decreases toward the protruding end (left end in FIG. 7) of the annular member from the axial inner surface of the seal ring 20. Therefore, foreign matter is less likely to disperse out of the inner spaces of such annular members.

The shape of the foreign matter reservoirs 3 is not limited to the shape exemplified above. The foreign matter reservoirs 3 may have any shape and be made of any material under the condition that if foreign matter attracted to the magnetic members 1 separates from the magnetic members 1, the foreign matter reservoirs 3 are able to catch and retain the foreign matter. For example, each foreign matter reservoir 3 may comprise a recessed reservoir constituted by a protruding member or members fixed to the inner surface of the seal ring 20, and capable of catching and retaining foreign matter. Such a protruding member or members may be fixed to the seal ring 20 by adhesion or welding, or may be integrally fixed to the seal ring 20 by insert molding.

While the magnetic members 1 and the filters 23 are formed by insert molding so as to be integral with the seal ring 20 in the above embodiments other than the embodiment of FIG. 7, in the embodiment of FIG. 7, the magnetic members 1 are fixed to the seal ring 20 to which the filters 23 are integrally connected by insert molding, by resin or adhesive. That is, the resin or adhesive forms magnetic member fixing portions 2 illustrated in FIG. 7 through which the magnetic members 1 are fixed to the seal ring 20. In this way, the magnetic members 1 may be fixed to the seal ring 20 by a method other than insert molding.

It is now described how the seal ring 20 functions. While the hydraulic pump is in use, as the rolling bearing 10 rotates, lubricant oil is partially dispersed toward a side surface of the rolling bearing 10, and thus partially toward the seal ring 20, from the outside of the bearing. A portion of the lubricant oil collides against the filters 23, fitted in the respective oil passage holes 22.

The filters 23 allow lubricant oil which has collided against the filters 23 to pass through the mesh portions of the respective filters 23, while catching foreign matter contained in the lubricant oil which has collided against the filters 23, and which is larger than the mesh sizes of the filters 23. After passing through the filters 23, lubricant oil flows into the bearing space, and lubricates the rolling bearing 10. In this way, the filters 23 can prevent harmful foreign matter discharged from the movable parts of the hydraulic pump from going into the rolling bearing 10.

If any of the filters 23 becomes clogged with foreign matter, the entire seal ring 20 can be easily replaced with a new seal ring 20.

If harmful foreign matter such as metal dust is generated in the bearing space as the rolling bearing 10 rotates, the foreign matter is attracted to any of the magnetic members 1 by the magnetic force thereof. Small foreign matter which has passed through the filters 23 is also attracted to the magnetic members 1. If foreign matter large enough to influence the service life of the rolling bearing 10 is generated in the bearing space, such large foreign matter is more likely to be attracted to any of the magnetic members 1.

Since the magnetic members 1 are mounted axially inwardly of the filters 23, it is possible to prevent foreign matter existing outside of the bearing from being attracted to the vicinity of the bearing. Also, since the magnetic members 1 are not directly exposed to the external space of the bearing, and the filters 23 are arranged axially outwardly of the magnet members 1 so as to be interposed between the magnetic members 1 and the external space of the bearing, the amount of foreign matter attracted to the magnet members 1 is relatively small. Therefore, it is possible to reduce the likelihood that a large amount of foreign matter attracted to the magnetic members 1 separates from the magnetic members 1 simultaneously all together.

In this way, it is possible to more reliably prevent foreign matter from floating in the bearing space.

The bearing 10, to which the seal ring 20 is mounted, may be any type of bearing, such as a tapered roller bearing including tapered rollers as the rolling element 13, a deep groove ball bearing including balls as the rolling elements 13, a cylindrical roller bearing including cylindrical rollers, or a self-aligning roller bearing including spherical rollers.

DESCRIPTION OF REFERENCE NUMERALS

1: magnetic member
2: magnetic member fixing portion
3: foreign matter reservoir
10: rolling bearing
11: outer race
11a: raceway
12: inner race
12a: raceway
12b: large diameter flange
12c: small diameter flange
13: tapered roller (rolling element)
14: retainer
20: seal ring
21: engagement portion
22: oil passage hole
22a: inner surface of oil passage hole
23: filter
24: protrusion
24a: inner protrusion
24b: outer protrusion
25: wall portion
27: lip mounting portion
30: seal groove
30a: inner seal groove
30b: outer seal groove
40a: circular annular member
41: lip portion
41a: abutment portion

The invention claimed is:

1. A rolling bearing comprising:
an outer race;
an inner race;
rolling elements mounted between the outer race and the inner race so as to define a bearing space between the outer race and the inner race, the bearing space having a first axial end opening at a first axial end of the rolling bearing and a second axial end opening at a second axial end of the rolling bearing;
a seal ring formed with an oil passage hole, the seal ring covering at least one of the first axial end opening and the second axial end opening;
a filter mounted to the seal ring so as to cover the oil passage hole of the seal ring, and configured to catch foreign matter contained in lubricant oil;
a magnetic member mounted axially inwardly of the filter toward the rolling elements, and configured to attract foreign matter to the magnetic member due to a magnetic force of the magnetic member; and
wherein the magnetic member is exposed to an inner surface of the oil passage hole.

2. The rolling bearing according to claim 1, wherein a space is defined between an axial inner surface of the filter and an axial outer surface of the magnetic member such that, due to the magnetic force of the magnetic member, the magnetic member is more likely to attract to the magnetic member foreign matter mixed in lubricant oil existing axially inwardly of the filter toward the rolling elements than to attract to the magnetic member foreign matter mixed in lubricant oil existing axially outwardly of the filter away from the rolling elements.

3. The rolling bearing according to claim 2, wherein the filter and the magnetic member are formed integrally with the seal ring by insert molding.

4. The rolling bearing according to claim 3, wherein the magnetic member is exposed to an inner surface of the oil passage hole.

5. The rolling bearing according to claim 3, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

6. The rolling bearing according to claim 2, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

7. The rolling bearing according to claim 1, wherein the filter and the magnetic member are formed integrally with the seal ring by insert molding.

8. The rolling bearing according to claim 7, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

9. The rolling bearing according to claim 1, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

10. A rolling bearing comprising:
an outer race;
an inner race;
rolling elements mounted between the outer race and the inner race so as to define a bearing space between the outer race and the inner race, the bearing space having a first axial end opening at a first axial end of the rolling bearing and a second axial end opening at a second axial end of the rolling bearing;
a seal ring formed with an oil passage hole, the seal ring covering at least one of the first axial end opening and the second axial end opening;
a filter mounted to the seal ring so as to cover the oil passage hole of the seal ring, and configured to catch foreign matter contained in lubricant oil;
a magnetic member mounted axially inwardly of the filter toward the rolling elements, and configured to attract foreign matter to the magnetic member due to a magnetic force of the magnetic member; and
wherein the magnetic member is provided axially inwardly of the filter toward the rolling elements and adjacent to the filter.

11. The rolling bearing according to claim 10, wherein a space is defined between an axial inner surface of the filter and an axial outer surface of the magnetic member such that, due to the magnetic force of the magnetic member, the magnetic member is more likely to attract to the magnetic member foreign matter mixed in lubricant oil existing axially inwardly of the filter toward the rolling elements than to attract to the magnetic member foreign matter mixed in lubricant oil existing axially outwardly of the filter away from the rolling elements.

12. The rolling bearing according to claim 11, wherein the filter and the magnetic member are formed integrally with the seal ring by insert molding.

13. The rolling bearing according to claim 12, wherein the magnetic member is exposed to an inner surface of the oil passage hole.

14. The rolling bearing according to claim 12, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

15. The rolling bearing according to claim 11, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

16. The rolling bearing according to claim 10, wherein the filter and the magnetic member are formed integrally with the seal ring by insert molding.

17. The rolling bearing according to claim 16, wherein the magnetic member is exposed to an inner surface of the oil passage hole.

18. The rolling bearing according to claim 16, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

19. The rolling bearing according to claim 10, further comprising a foreign matter reservoir located axially inwardly of the magnetic member toward the rolling elements, the foreign matter reservoir being configured such that if foreign matter attracted to the magnetic member separates from the magnetic member, the foreign matter is caught and retained in the foreign matter reservoir.

* * * * *